Patented Jan. 9, 1940

2,186,887

UNITED STATES PATENT OFFICE 2,186,887

PROCESS FOR THE CONCENTRATION OF AN AQUEOUS SOLUTION BY FREEZING

Friedrich Steinbacher, Grunwald, near Munich, Germany, assignor of one-half to Gesellschaft fur Lindes Eismaschinen A.-G., Wiesbaden, and one-half to Georg Alexander Krause, Munich, Germany No Drawing. Application August 14, 1937, Serial No. 159,196. In Germany September 25, 1936

6 Claims. (Cl. 62—124)

It is known to concentrate solutions, such as fruits juices, milk, meat extracts, and the like, by freezing out a portion of the water content and mechanically separating the ice from the unfrozen concentrated solution. However, with the procedure heretofore employed for effecting the freezing-out concentration of solutions, it has not been economical to carry the concentration above about 50% of dissolved substance. Attempts to carry the concentration above this point have resulted in excessive losses of the dissolved substance.

Now, according to the present invention, it has been found that, instead of keeping the temperature of the cooling agent practically constant during the freezing operation, as has been done heretofore, by lowering the temperature of the freezing agent as the concentration proceeds, especially in the later stages of the concentration, considerably higher concentrations with acceptable losses may be obtained. The temperature of the cooling agent preferably is adjusted downwardly as the concentration proceeds, roughly proportionally to the lowering of the ice precipitation temperature due to the concentration.

Numerous practical embodiments of this idea may be devised which will be apparent from the following disclosure.

Orange juice which has been brought to a concentration of 45% by weight of dissolved substance in the usual way by freezing out water and separating the ice is charged into a freezing cell. If it is desired to concentrate this solution to 60% of dissolved substance, it has been customary heretofore to apply a cooling agent, e. g. a brine bath, at a temperature of about —26° C. because the equilibrium temperature between the ice and a solution of 60% dissolved substance is at about —22° C. and a temperature difference of about 4° is provided in order to take care of the heat transfer between the solution and the cooling agent. In accordance with the present invention, however, the 45% solution is first treated with cooling agent at, say, about —14° C., at which temperature ice is in equilibrium with a solution of about 52% dissolved substance. Then after some ice has been precipitated and the equilibrium temperature correspondingly lowered the temperature of the cooling agent is lowered and this procedure is continued until the solution has attained the desired concentration.

The lowering of the temperature of the cooling agent may take place continuously at the deposition of ice and lowering of the equilibrium temperature proceeds, the rate of cooling, that is, the difference between the temperature of the solution and the cooling agent preferably becoming less and less as the operation proceeds. Or the lowering of the temperature of the cooling agent may occur in stages of suitable size. For example, after the solution in the freezing vessel has been acted upon by the cooling bath at —14° C., the freezing vessel may be transferred to a cooling bath at, say, —20° C., and finally to a cooling bath at —26° C. Or the cooling may be divided into only two stages whereby 20 to 30% of all of the ice to be removed from the 45% solution is frozen out at a temperature of —14 to —16° C. and the remainder at —26° C.

In a specific instance a freezing cell was charged with partially concentrated orange juice having a concentration of dissolved substance of 45% and treated with brine at —15 to —16° C. until about 20% of the water content of the juice was precipitated as ice. The cell was then transferred to another freezing receptacle with a brine temperature of —26° C. A second batch of the partially concentrated juice was treated in exactly the same way excepting that the cooling was accomplished in one stage in a brine bath held at —26° C. The ice was separated from the solutions by centrifuging the two batches for the same length of time. It was found that the concentrate produced from the first batch of juice which was cooled in two stages contained about 61% of dissolved substance, while the second batch which was cooled in a single stage gave a concentrate containing 59% of dissolved substance. This higher concentration obtained by the process of the invention may have a considerable influence on the value of the concentrate particularly from the standpoint of its keeping qualities, for instance, in tropical countries. The yield of concentrate by the process in accordance with the invention was about 15% greater than by the single-stage freezing process. Considering the higher yield of solution and the higher concentration thereof in dissolved substance, the total gain in recovery of dissolved substance attributable to the present process as compared with the single-stage freezing process amounts to about 20%. The amount of dissolved substance separated with the ice was about 30% less in the process of the invention than in the single-stage freezing process.

The improved results with respect to both the yield and concentration of the solution may be attributed to the fact that in the process of the present invention larger and better formed crystals are produced by the relatively gradual cooling of the solution. When a solution of 45% concentration of dissolved substance is subjected directly to a temperature of −26° C., this temperature being far below the ice precipitation temperature, a dense structure of relatively small crystals is formed from which the solution cannot readily be separated, whereas when the difference between the temperature of the cooling agent and the ice precipitation temperature is relatively small, large and well formed crystals are produced from which the solution can be separated more readily and efficiently.

The new process is especially advantageous in the treatment of relatively concentrated solutions. This is because the change in the ice precipitation temperature due to the freezing out of a certain amount of ice is greater in the treatment of relatively concentrated solutions than in the treatment of dilute solutions. However, the same principle is applicable with some advantage in the treatment of dilute solutions, that is, in the first or earlier stages of the concentration.

I claim:

1. Process for the concentration of an aqueous solution by freezing out a part of the water content of a quiescent body thereof to the formation of a coherent ice structure and separating the resulting ice from the remaining unfrozen solution in which the cooling temperature applied to the whole body of the solution is lowered during the freezing operation.

2. Process for the concentation of an aqueous solution by freezing out water and separating the resulting ice in which the whole of a quiescent body of the solution is subjected to lower and lower cooling temperatures as the precipitation of ice proceeds.

3. Process for the concentration of an aqueous solution by freezing out water and separating the resulting ice in which the cooling temperature applied to the whole of a quiescent body of the solution is adjusted downwardly to the final lowest cooling temperature as the precipitation of ice proceeds, the lowering of the cooling temperature being maintained at least approximately proportional to the lowering of the ice-solution equilibrium temperature of the solution as the concentration of the solution due to the precipitation of ice proceeds.

4. Process of concentrating an aqueous solution by freezing out a portion of the water content and separating the resulting ice which comprises subjecting the whole of a quiescent body of the solution to a cooling temperature substantially above the temperature required to accomplish the desired final concentration, and thereafter subjecting the entire resulting mass to the cooling temperature required to accomplish the desired final concentration.

5. Process of concentrating an aqueous solution by freezing out water and separating the ice which comprises cooling the whole of a quiescent body of the solution in stages down to the final low temperature necessary to accomplish the desired final concentration, the temperature at each stage being only slightly below the ice precipitation temperature of the remaining unfrozen solution at that stage.

6. Process for the concentration of fruit juices containing in the neighborhood of 45% of dissolved substance which comprises subjecting the whole of a quiescent body of the fruit juice to a cooling temperature not lower than about −16° C. until it substantially attains said cooling temperature and then subjecting the entire resulting mass to a cooling temperature of about −26° C.

FRIEDRICH STEINBACHER.